Aug. 30, 1927.

H. D. GEYER ET AL 1,640,763

LOCKING STEERING WHEEL

Filed May 22, 1923

Witnesses.

Inventors.
Alva W. Scott
Harvey D. Geyer
Ralph W. Chilton
By
Their Attorney.

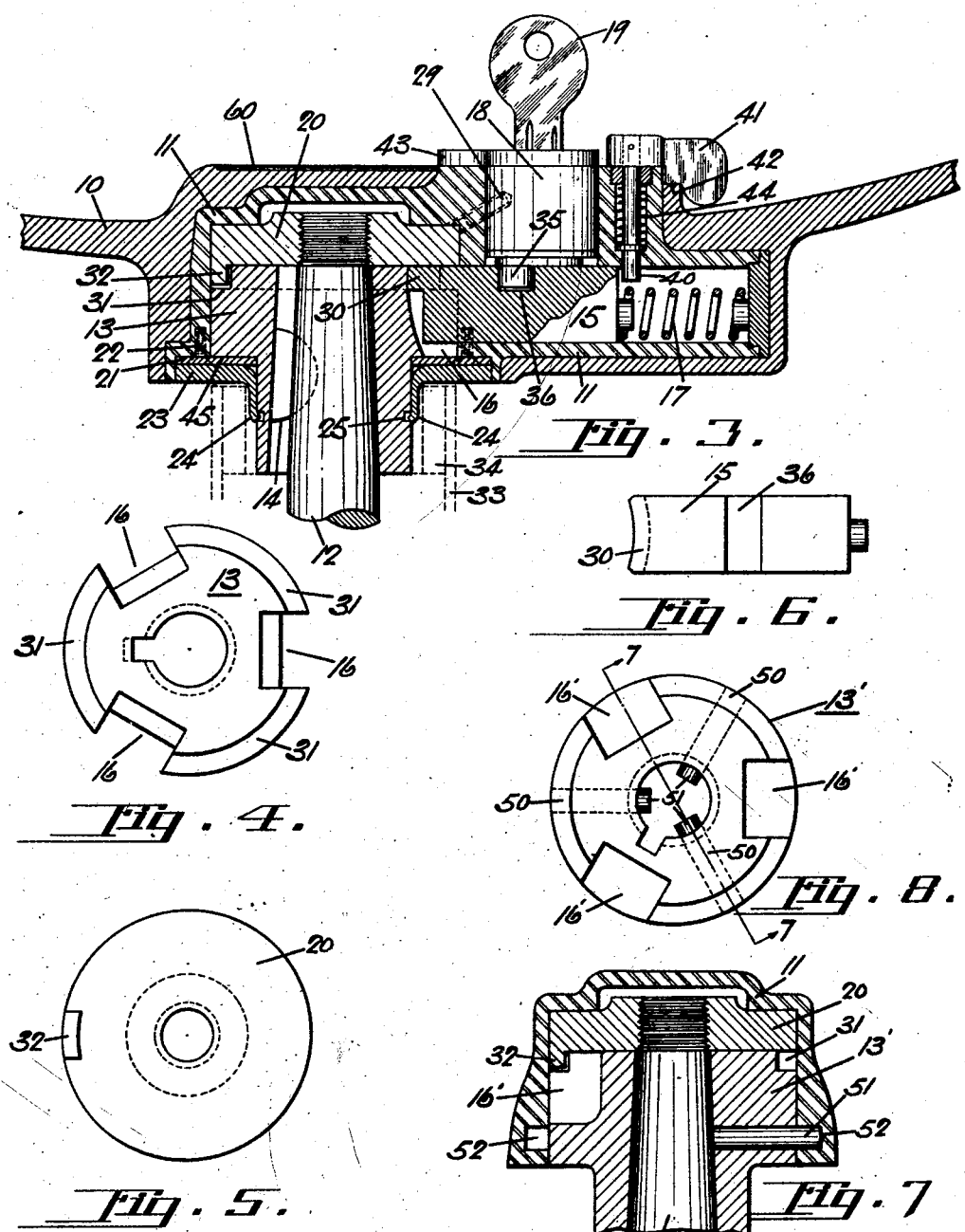

Patented Aug. 30, 1927.

1,640,763

UNITED STATES PATENT OFFICE.

HARVEY D. GEYER AND ALVA W. SCOTT, OF DAYTON, OHIO, ASSIGNORS TO THE INLAND MANUFACTURING COMPANY, OF DAYTON, OHIO, A CORPORATION OF DELAWARE.

LOCKING STEERING WHEEL.

Application filed May 22, 1923. Serial No. 640,783.

This invention relates to locking handwheels and is especially adapted for steering wheels for motor vehicles.

One object of this invention is to provide a locking steering wheel which is of simple and rugged construction, easily operated, of good appearance, and which gives the maximum of protection against thieves.

Another object is to provide a safety device which will prevent any possible release of the locking means during driving, and incidentally will permit a weaker spring pressure against the locking bolt and hence render the lock more easily operated.

Another object is the provision of a completely encased mechanism for both holding the wheel against axial displacement and for rendering it rotatably fixed or loose upon its shaft, the same locking means being used for both purposes.

Another object is the provision of an unbroken top surface through which no parts project at the center of the spider thereby permitting a permanent writing pad to be placed there.

Further objects and advantages of the present invention will be apparent from the following description, reference being had to the accompanying drawings, wherein a preferred form of embodiment of the present invention is clearly shown.

In the drawings:

Fig. 3 is a vertical section through the center line of the wheel, but showing certain small parts in elevation.

Fig. 4 is a plan view of the keeper member for the locking bolt.

Fig. 5 is a bottom view of the nut which is threaded to the top of the steering column.

Fig. 6 is a plan view of the locking bolt.

Fig. 7 is a vertical section similar to Fig. 3 and shows a modified means for securing the keeper member to the wheel to prevent axial displacement thereof.

Fig. 8 is a plan view of the keeper member used with the modification shown in Fig. 7.

Throughout the several views of the drawings, similar reference characters refer to similar parts.

Figure 1:
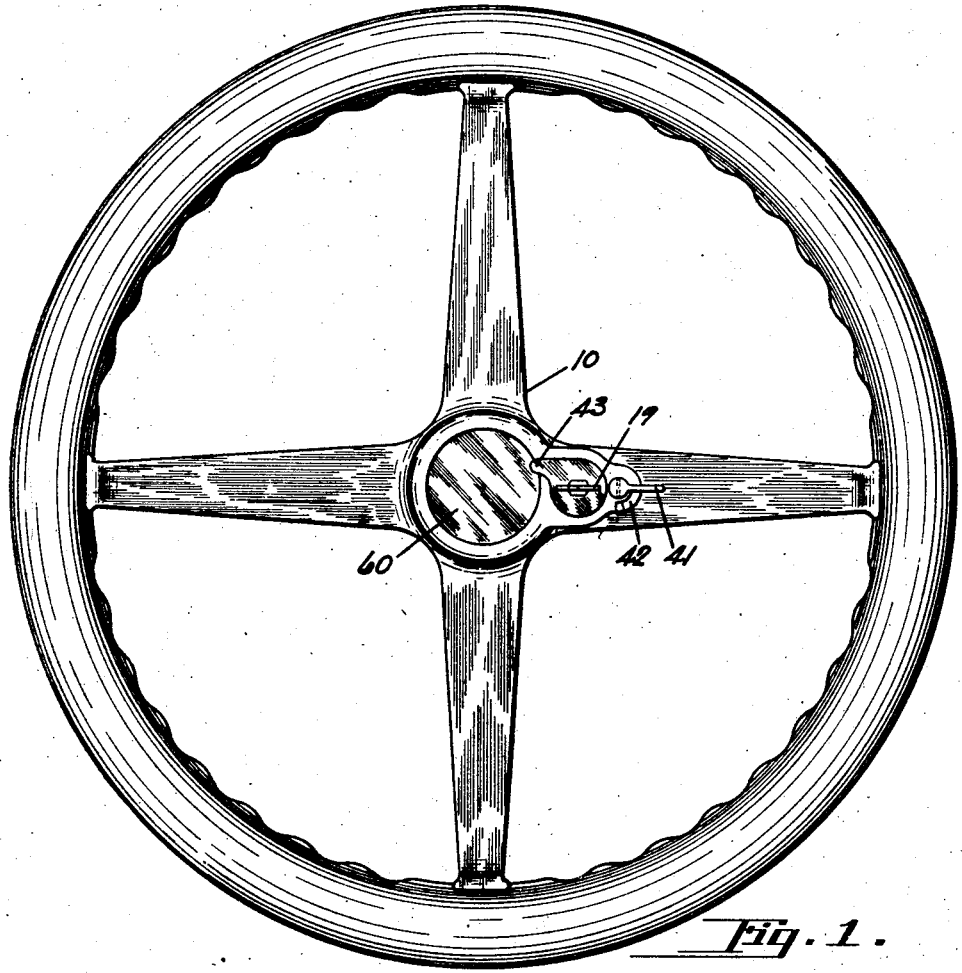
Fig. 1 is a plan view of a steering wheel built according to this invention.

The spider 10 is preferably an aluminum casting, the hub and lock casing being preferably integral with the spider arms. A case hardened forging 11 is cast in the aluminum spider 10, after first being machined to the proper dimensions and case hardened in a manner well known to those skilled in the art. This hardened casing 11 houses all the mechanism of the wheel and prevents a thief from drilling or cutting through any parts of the lock or hub to release the locking bolt or to fix the wheel non-rotatably upon the steering column in any possible manner.

The tapered end of the steering column 12 is shown projecting from a stationary housing tube 33 having a bushing 34 fixed in its upper end serving as a guide for the rotatable parts within it. However this invention may be used on a steering column having no housing tube 33 or bushing 34 and still be thief proof.

A keeper member 13 fits snugly over the tapered end of column 12 and is keyed thereto by the key 14 which fits in a suitable groove in keeper 13 as shown. Keeper 13 is provided at its periphery with three radial recesses 16, into any one of which the sliding bolt 15 may be inserted to non-rotatably lock the wheel upon column 12. The bolt 15 is reciprocated back and forth as desired by means of an eccentric lug 35 on the rotatable barrel of a Yale or similar lock 18 which is operated by the ordinary key 19. The lug 35 cooperates with a transverse slot 36 in the top of bolt 15 to throw bolt 15 back or forward in a manner which will be clearly understood from the drawings. A compression spring 17 secured in place by any suitable means, as by the lugs shown in Fig. 3, presses bolt 15 towards keeper 13 at all times and when key 19 is turned to locking position causes the bolt 15 to snap into the first recess 16 which may register therewith.

A nut 20 is screw threaded on the end of column 12 and prevents keeper 13 from being pulled up from the column. An annular disk 21 is screwed to the forging 11 by screws 22, these screws 22 of course being spaced around the periphery so they do not interfere with the bolt 15. This disk 21 projects under the shoulder 45 of the keeper 13 and so prevents the entire wheel from being pulled upwardly when the bolt 15 is in its back or unlocked position. A hardened plate 23 conceals plate 21 and its retaining screws 22 to prevent a thief from removing said plate 21 and so enabling him to remove the entire wheel. Plate 23 is held in place by having the bottom edge 24 of its flange hammered or pressed into the circular groove 25 in keeper 13, thus completely housing the entire mechanism with a non-removable hardened casing. The stationary barrel of the lock 18 is secured rigidly in place by one or more concealed set screws or pins 29 which are preferably inserted from the interior, as shown in Fig. 3, before nut 20 or keeper 13 are put in place.

The assembly of the wheel upon the steering column 12 will now be described. The nut 20 is placed loosely in the recess in forging 11 provided therefor before the keeper 13 is inserted below it and permanently held in place by disk 21 and screws 22, and plate 23 with its edge 24 turned into groove 25, all as above described. The assembled wheel is now placed over the tapered column 12 with the key 14 in position, the top thread of column 12 abutting the bottom thread of nut 20. Bolt 15 is next withdrawn from its recess 16 by the key 19 far enough so the wheel may be revolved loosely around the keeper 13, but leaving the lug 30 on the end of bolt 15 projecting into the annular groove 31 around the top of keeper 13. The nut 20 also has a small lug 32 projecting downwardly into this annular groove 31, hence when the wheel is turned loosely about keeper 13 the lug 30 on bolt 15 will strike lug 32 on nut 20 and will thus act as a wrench to rotate nut 20 with the wheel until nut 20 is screwed home upon column 12. The bolt 15 may now be drawn back its full travel by means of key 19 and thus permit the free rotation of the wheel. When the key 19 is again turned to move bolt 15 toward keeper 13, spring 17 will press the bolt against the outer periphery of keeper 13 until, as the wheel is turned, it snaps into the first recess 16 which registers with it. By providing three recesses 16 instead of only one it is necessary to rotate the wheel only a third of a revolution at most, before one recess 16 will register with bolt 15 and so permit the bolt to snap in locked position. Column 12 is preferably given only a slight taper so that the keeper 13 will not come to a sudden stop as it is drawn down over column 12 by the nut 20. Hence nut 20 may be suitably tightened upon its threads and yet not have the lug 32 fall opposite any one of the recesses 16. If it should be unavoidable however to block out one of the recesses 16 by the lug 32, the other two recesses 16 can still be used for locking the bolt 15 to keeper 13.

A safety catch 40 is provided to hold bolt 15 positively in locked position independently of the pressure of spring 17 and so prevent accidental displacement thereof during driving. Catch 40 is provided with a compression spring 44 acting to press it downwardly at all times, and with a thumb wing 41 whose bottom edge bears upon a stationary cam surface 42. When it is desired to render the wheel loose the catch 40 is drawn up by rotating the thumb wing 41 upon the cam surface 42, after which the bolt 15 may be shot back by the key 19. In so turning key 19 to shoot the bolt back, a projection 43 on the rotatable lock barrel will engage wing 41 and rotate it back into a position where it will be free of the cam surface 42. However before the projection 43 engages wing 41 the bolt 15 begins to move back and hence catch 40 rides on the top surface of bolt 15 and so is prevented from being pressed down by spring 44 even after wing 41 is free of the cam surface 42. The bolt 15 having been moved back its full travel, the key 19 may be withdrawn and the machine left with the parts in this position.

When it is again desired to use the machine key 19 is inserted in the lock and bolt 15 moved inward until it strikes the periphery of keeper 13. The steering wheel is next given a third of a revolution (or less) whereupon bolt 15 snaps into a recess 16 under pressure from spring 17, and, immediately after the rear end of bolt 15 clears the catch 40, said catch will snap behind bolt 15 under pressure from spring 44. The wheel is now safely locked in steering position. Since catch 40 is automatically moved to its potential safety position when the wheel is made loose, the safety feature is not dependent upon the memory of the driver to apply the safety catch.

Possibly the greatest advantage of the safety catch is that it permits the use of a quite weak spring 17 and hence the lock will be very easy to operate by means of the small key 19. With a number of locking wheels now on the market the key is very difficult to turn on account of having to overcome the pressure of the strong spring which is necessary to hold the bolt in lock position.

Figure 2:
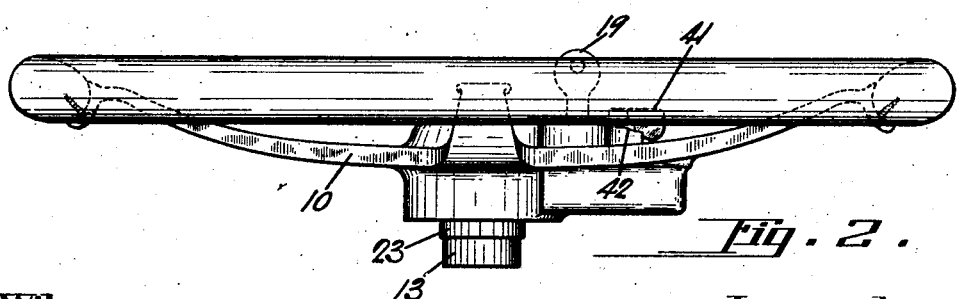
Fig. 2 is a side elevation thereof.

Figs. 7 and 8 show a modification of the means for preventing a thief from removing the steering wheel from the column 12, all other parts of the wheel being as shown in Figs. 1 to 6. The keeper 13′ is provided with three radial holes 50 in which the pins 51 have a sliding fit. The forging 11 is provided with an annular groove 52 which will register with the radial holes 50, and in which the projecting ends of the pins 52 may revolve when the wheel is loose.

To assemble the wheel upon the column 12: Insert the three pins 51 in the holes 50 until their outer ends are flush with the periphery of keeper 13′, the inner ends of pins 51 of course projecting within the central aperture as shown in Fig. 8. Next insert the nut 20 and the keeper 13′ within the recess provided therefor in the forging 11 until holes 50 register with the groove 52. By inserting a finger or any suitable tool in the central aperture the pins 51 may be pressed outwardly into groove 52 until the inner ends of pins 51 are flush with the walls of the central aperture. The assembly is now placed over the tapered steering column 12 which of course is provided with a key and keyway as in Fig. 3. The nut 20 is screwed upon the threaded end of column 12 by means of the lug 30 on bolt 15 engaging the depending lug 32 on nut 20, in the manner described above for the other modifications. The column 12 abuts the inner ends of pins 51 and holds them in engagement with the forging 11. These pins 51 prevent the withdrawal of the wheel from the steering column, and since they are entirely concealed they will be absolutely free from tampering at the hands of a thief. The recesses 16' in keeper 13' are closed at the bottom as shown in Fig. 7 to render the bolt 15 inaccessible from below.

The annular groove 52 preferably lies entirely below the recess in forging 11 for the bolt 15 to avoid any possible interferences between the bolt 15 and projecting ends of pins 51.

An important feature of this locking wheel is its neat outside appearance. Since the locking mechanism takes up only a small space the wheel appears substantially symmetrical when viewed from above (see Fig. 1), and since no parts extend through the top surface of the hub portion this space has been utilized by suitably fastening therein a permanent memorandum pad 60. This pad 60 is preferably slightly countersunk and is made of white roughened celluloid, pyrolin, or some similar material which is decorative and can be written upon with pen or pencil and easily erased thereafter.

While the form of mechanism of the invention as herein disclosed, constitutes a preferred form, it is to be understood that other forms might be adopted, all coming within the scope of the claims which follow.

What we claim is as follows:

1. In a vehicle having a steering shaft, in combination, a steering wheel rotatably mounted upon said shaft, locking means for locking the wheel non-rotatably upon said shaft, a key lock for moving said locking means, a safety means independent of said key lock to positively hold said locking means in locked position, and means for automatically moving said safety means into safety position when the wheel is locked upon the shaft.

2. In a vehicle having a steering shaft, in combination, a steering wheel rotatably mounted upon said shaft, locking means for locking the wheel non-rotatably upon said shaft, a key lock for moving said locking means, a safety means to positively hold said locking means in locked position, a manual means for releasing said safety means to permit the release of said locking means, and means for automatically moving said safety means into safety position when the wheel is locked upon the shaft.

3. In a vehicle having a steering shaft, in combination, a steering wheel rotatably mounted upon said shaft, a bolt for locking the wheel non-rotatably upon said shaft, a key lock for moving said bolt, a safety catch to positively hold the bolt in locked position, manual means independently operated for releasing said safety catch, and automatic means for applying said safety catch when the bolt is locked.

4. In a vehicle having a steering shaft, a steering wheel rotatably mounted upon said shaft, a stop means fixed to said shaft for preventing the axial displacement of the wheel on the shaft, locking means for locking the wheel at will non-rotatably upon said shaft, and means associated with said locking means for rendering said stop means fixed to said shaft.

5. In a vehicle having a steering shaft, a steering wheel rotatably mounted upon said shaft, a stop means rigidly fixed to said shaft and inaccessible from the exterior of the wheel for preventing the axial displacement of the wheel on the shaft, locking means for locking the wheel at will non-rotatably upon said shaft, and means associated with said locking means for securing said stop means in operative position.

6. In a vehicle having a steering shaft, a steering wheel rotatably mounted upon said shaft, locking means for locking the wheel at will non-rotatably upon said shaft, stop means threaded to said shaft for preventing the axial displacement of the wheel, and means associated with said locking means whereby the locking means may be used as a wrench for securing the stop means to said shaft or removing it therefrom.

7. In a handwheel and shaft locking means a head attached to said shaft, a nut threaded upon said shaft and adapted to hold the head thereon, a wheel whose hub is journaled upon said head and forms a means for preventing access to said nut, a locking bolt for rendering said wheel fixed or loose upon said shaft, said bolt being adapted in one position to engage said nut whereby said nut may be assembled upon said shaft by the bolt acting as a wrench.

8. In a handwheel and shaft locking means, a head fixed to said shaft against rotational or axial movement thereon, a wheel whose hub is journaled upon said head and forms a housing for preventing access to said head, locking means for rendering said wheel fixed or loose upon said shaft, and means for holding said wheel against axial withdrawal from said head comprising a pin slidably mounted in a recess in said head and projecting laterally from said head into an annular groove on the inner periphery of said wheel hub.

9. In a handwheel and shaft locking means, a head fixed to said shaft against rotational or axial movement thereon, a wheel whose hub is journaled upon said head and forms a housing for preventing access to said head, locking means for rendering said wheel fixed or loose upon said shaft, and means for holding said wheel against axial withdrawal from said head comprising completely concealed means projecting laterally from said head into an annular groove on the inner periphery of said hub.

10. In a handwheel and shaft locking means, a head fixed to said shaft against rotational, or axial movement thereon, a wheel whose hub is journaled upon said head and forms a housing for preventing access to said head, locking means for rendering said wheel fixed or loose upon said shaft, and means for holding said wheel against axial withdrawal from said head comprising concealed means movable in a lateral recess extending through said head and held projecting laterally from said head into an annular groove on the inner periphery of said hub.

11. In a wheel and shaft locking means, a wheel having an enlarged central portion comprising a protective shell for parts within, a journal head mounted within said shell and adapted for attachment to said shaft, anchoring means within said shell adapted to anchor said head upon said shaft, and lock operated means for controlling said anchoring means whereby said journal head and anchoring means may be mounted in operative position upon said shaft while assembled within said protective shell.

In testimony whereof we hereto affix our signatures.

HARVEY D. GEYER.
ALVA W. SCOTT.